No. 617,856. Patented Jan. 17, 1899.
R. F. FOSTER.
METHOD OF AND APPARATUS FOR SIGNALING.
(Application filed Sept. 17, 1898.)
(No Model.)

UNITED STATES PATENT OFFICE.

ROBERT FREDERICK FOSTER, OF NEW YORK, N. Y., ASSIGNOR OF ONE-HALF TO CHARLES A. HAMILTON, OF RIDGEFIELD, CONNECTICUT.

METHOD OF AND APPARATUS FOR SIGNALING.

SPECIFICATION forming part of Letters Patent No. 617,858, dated January 17, 1899.

Application filed September 17, 1898. Serial No. 691,217. (No model.)

*To all whom it may concern:*

Be it known that I, ROBERT FREDERICK FOSTER, a subject of the Queen of Great Britain, residing in the city, county, and State of New York, have invented certain new and useful Improvements in Methods of and Apparatus for Signaling, of which the following is a specification.

My invention relates to a method of and apparatus for signaling to indicate the direction from and to which the signal is sent, the object being to provide an improved system or method of signaling and an apparatus for carrying it out; and to these ends my invention consists in the various features substantially as hereinafter more particularly pointed out.

Figure 1:
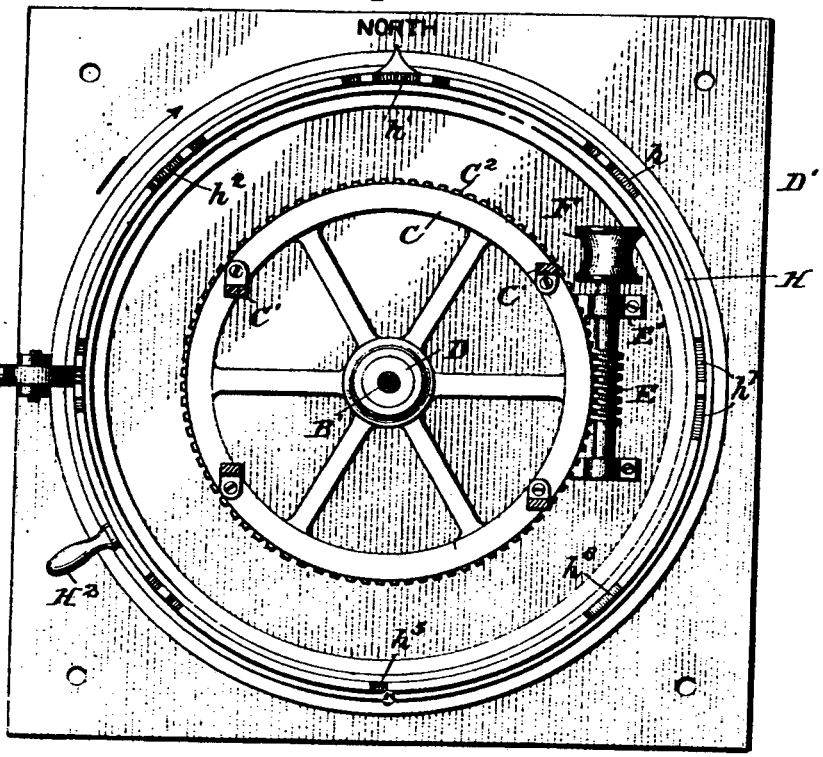
Figure 2:
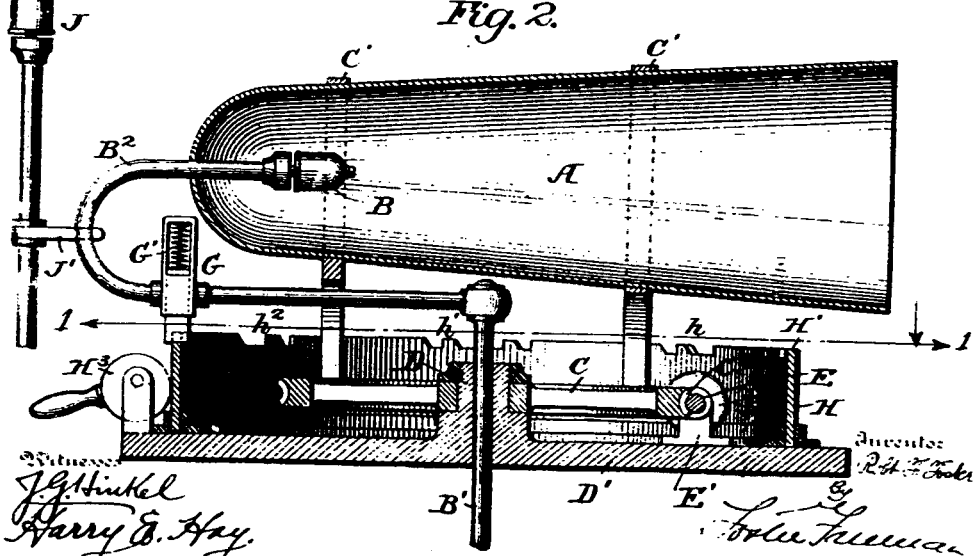

Referring to the accompanying drawings, Figure 1 is a horizontal section on the line 1 1, Fig. 2, looking downward; and Fig. 2 is a vertical central transverse section of Fig. 1.

It is a well-recognized fact that some improved method or system of signaling is desirable, whereby the direction of a dangerous object can be determined with accuracy and certainty, especially in connection with vessels at sea and more especially in foggy weather, so that the direction of other vessels or of a dangerous object—as, for instance, a point of land—can be ascertained. Many systems and devices for accomplishing this general object have been proposed, and without reciting the various suggestions in detail it may be said in general that these suggestions embody some sort of an apparatus which disseminates the sound equally in all directions—as, for instance, when used on a moving vessel these sounds have been made distinctive for the purpose of indicating the course the vessel is taking or the direction in which it is being steered. In this latter case the predetermined signal is repeated continuously as long as the vessel holds a given course, and while it may be more or less effective in furnishing information as to the course of the vessel it does not furnish what has been demonstrated to be a more important fact, which is the direction of the dangerous object with relation to the observer or party receiving the signal. It has also been proposed to overcome the above objection by providing the observer or party hearing the signal with some sort of an instrument which will aid him in determining the direction from which the signal came; but even these in actual practice have proven faulty in many instances, owing to the difficulty in positively determining the direction of the dangerous point, and it may be observed that instances are known where two officers on the same vessel have differed widely in their opinions as to the real direction of the dangerous object, and without such appliances it is still more difficult to determine the direction of the dangerous object, and many instances are on record where serious accidents have happened through a misjudgment of the observers as to the real direction of the danger. My invention is distinguished from these various systems or methods of signaling in that the signal itself is of such a character that it indicates to any observer hearing the signal the absolute direction from which the signal is sent, and consequently the direction from the observer of the dangerous object, whether a moving or stationary object, as a vessel in motion or at anchor, or a point of land or other object to be avoided. Further, by my invention the signals sent are projected in certain given and definite directions in contradistinction to being spread in every direction equally, and this is accomplished, broadly considered, by projecting concentrated sound-waves in a certain predetermined direction or directions. Furthermore, by my invention I provide a certain predetermined character of signal to be projected in the different or desired directions, and each signal indicates to the observers a certain definite direction under all conditions.

In carrying out my invention or system of signaling I provide what may be broadly defined as a "sound-director," which is an instrument such, for instance, as a megaphone or reflector, which will concentrate the sound-waves and project them in substantially the general direction of the axis of the instrument, so that within a given radius in front of the sound-director the sounds will be heard much more distinctly than in any other position with relation to the axis of the instrument. Furthermore, I provide means for varying the character of the sounds produced and sent by the sound-director in certain given directions, which characterizations enable the observer to determine with accuracy the direction from which the sounds proceed and to distinguish the different signals the one from the other. I also provide means whereby the various characteristic signals may be given in a predetermined order or succession and whereby they may be directed in certain predetermined directions from the dangerous object.

Other features of my invention will be apparent from the more detailed description hereinafter given, and it will be observed also that my improved method or system of signaling is distinctive from others which have been proposed principally in that the signals sent always indicate to the observer the direction from which and to which the signals are sent, and it is evident that various forms and constructions of apparatus may be used in carrying out the broad principles of my invention, and the one which I am about to describe is set forth as typical of such a construction and as one which is effective and simple in operation, although, of course, it is to be understood that my invention is not limited thereto.

Referring to the drawings, A is what I have termed, broadly, a "sound-director," shown in the present instance in the shape of a megaphone or reflector and adapted to concentrate the sound-waves and project them with greater intensity along the axis of the sound-director than in any other direction. Arranged, preferably, within the focus of the sound-director is a sounder or sound-producing device B, which may be in the form of a whistle, reed, siren, or any other proper instrument adapted for the purpose. In the present instance it is shown typically as a whistle adapted to be operated by steam, air, or fluid. This sound-director and sounder are so mounted as to be readily brought into certain definite positions or relations to a certain point—as, for instance, the north point of the compass—and while many and various means may be employed for this purpose I have shown it as mounted on a wheel C by suitable supports C' C', and this wheel is itself supported upon a bearing D of any suitable character mounted on a proper base D'.

When the sounder B is only operated by a fluid, as it must rotate with the sound-director, it is preferable to provide means, as a pipe B', passing through the bearing D and having a suitable joint connection with a pipe B², directly connected with the sounder, so that the connection may be maintained regardless of the position of the sounder and sound-director.

Some suitable means should be provided for giving a motion of rotation to the sound-director, and in the present instance, as this is mounted upon the wheel C, I have shown a worm E, engaging the worm-teeth C² on the wheel C, the worm being mounted in bearings E' on the base D'. This worm-wheel may be driven in any desired manner from any source of power, as a wire rope from the engine-room passing around a drum F on the worm-wheel shaft. Any means of producing a regular motion of rotation of the sound-director may of course be used that shown being simple and effective and has the additional advantage that the sound-director is securely held in its proper position against any tendency of its motion being affected by the force of the wind or other disturbances.

Some suitable means must be provided by which the character of the signals given by the sounder B can be determined, and these of course will depend upon the character of the sounder itself, and in the present instance, where the sounder is operated by a fluid under pressure, I have shown a valve device G, arranged in the pipe B², and while many forms of valve devices may be used I have indicated a slide-valve arranged in the pipe B² and normally under the stress of a spring G', tending to close and keep the valve closed, this spring being mounted in a suitable housing in the valve device.

In order to operate the valve to produce the predetermined signals, many devices may be used, and as in the present embodiment of the invention I produce a certain number of characteristic signals in a certain definite relation to each other I have shown a device which is simple and yet effective to accomplish this purpose in the form of a ring H, mounted on the base D' in proper relation to the valve device G, arranged so that its upper edge H' will operate the valve. The upper edge of the ring in the present instance is shown as provided with a series of notches $h\ h'\ h^2$, &c., of different shape or character and so arranged that when the notches come opposite or under the valve the latter will move downward under the stress of the spring, thus producing a signal, and the character of the signal is determined by the length of the notches and the particular arrangement of a group of notches with relation to each other. Thus it will be observed that some of the notches are short and give a short blast and others are longer to give a longer blast, and the length of the blasts and the relations of the short and long blasts can be arranged on any predetermined plan.

If the signaling device is located on a fixed point, as a point of land, it is only necessary to properly adjust the ring H with relation to the point of the compass in order that the sound-director shall give the proper signals at each desired point of its rotation; but if the signaling device is located on a moving object—as, for instance, a ship, which changes its relations to the point of the compass—it is necessary to provide means for adjusting the signal-determining device, as the ring, with relation to the vessel's course, and I therefore provide some means for rotating the ring H—as, for instance, a handle H², —and preferably also provide some means for securing the ring in position—as, for instance, the locking-cam H³. With this simple construction it will be seen that the general features of my invention may be carried out whether the signaling device is used in a stationary or moving position, and it will also be observed that other devices accomplishing the same general result will readily suggest themselves to those skilled in the art without a departure from the principles of my invention.

As it is also desirable in the case of a moving object provided with my signaling device to give a signal indicating the course or direction in which the object is moving, I preferably combine with my signaling device thus far described an independent signal for accomplishing this object, and in the present instance I have shown an independent signal J, which is preferably of different character from that of the sounder B—as, for instance, of an entirely different tone or otherwise—and which is mounted in fixed relation to the bow of the vessel and in juxtaposition to my signaling device. This course or secondary signaling device may be operated from an independent source of power or from the same source; but its operations are controlled by my improved signaling device in any suitable way, the essential feature being that when my sound-director points directly toward the bow of the vess on which it is placed it shall operate the course or auxiliary signaling device, and if, perchance, the course of the vessel corresponds with any one of the predetermined directions in which the sound-director is operated both signals will be sounded simultaneously and will not only indicate the direction from which the sound proceeds, but also the direction or course of the vessel carrying the signaling instrument. It will also be observed that if the course-signaling instrument should sound between two signals of the sound-director the course of the vessel would evidently be between the two directions indicated by the sound-director.

In order to operate the auxiliary sounder, in the present instance I arrange a valve device J' with a projection extending within the path of travel of the pipe B² of the signaling device or any other moving part thereof, so that as the signaling device rotates once during each revolution it will operate the auxiliary or course signaling device.

While in carrying out my invention any desired code of signals may be used and they may be arranged in any desired order, sequence, or relation, I have found it desirable and satisfactory to provide eight different signals corresponding with the eight principal divisions of the compass, and in order to aid the memory and serve to readily distinguish the different signals in the present instance I have arranged the signals so that all those signifying the general direction of "west" commence with a short signal, while all those signifying the general direction of "east" commence with a long signal, and in the present instance these signals increase in number or duration from south toward north. Thus, referring to Fig. 1, the notch $h^5$ is a short notch to produce a single short blast or signal, while the next notch, $h^6$, is a long notch to produce a longer blast, and the next succeeding blast will be made up of two long blasts by means of the two long notches $h^7$, and so on, as clearly indicated therein.

It will be understood that under all conditions a single short signal, such as produced by the notch $h^5$, will indicate that the sound-director projects the sound-waves toward the north, thereby indicating that the source of the signal is due south from the observer. So, on the other hand, if the signal produced is a short, a long, and then a short signal the observer will at once recognize that the source of the signal is due north, and so on in connection with all the other points of the compass, the character of the signal distinctly defining to the observer the direction from which the signal proceeds.

As before indicated, if the observer is in a direct line with the axis of the sound-director he will hear the signal with the greatest distinctness; but if, perchance, he is in some other position with relation to the axis of the instrument—as, for instance, midway between the positions of the axis in two successive signals—the observer will hear the signals less distinctly than when in the direct line of the axis, but will hear the two signals with equal distinctness and will then be able to determine the exact direction from which the signals proceed, which will be midway between the points indicated by the two successive signals.

One of the advantages arising from the use of my invention, especially where it is in a stationary position, as adjoining a lighthouse, is that an observer—for instance, on a moving vessel—cannot only determine the direction from which the signal proceeds, but also with greater or less exactness the distance of the dangerous object. Thus, for instance, supposing a moving observer should hear a signal indicating that the dangerous point was northwest from him and after his vessel had moved a given distance, as two miles, he receives a signal indicating that the dangerous object is due north, knowing that the axis of the sound-director in giving these two distinctive signals is exactly forty-five degrees apart he has his base-line and his two angles and can readily calculate the distance of the signaling device.

What I claim is—

1. The method substantially as hereinbefore set forth of signaling to indicate the direction from and to which a signal is projected, which consists in projecting concentrated sound-waves in various predetermined directions and in varying the character of the signals in accordance with the various points of the compass, whereby the observer within the range of any of the sounds can determine the direction of the source of said signals.

2. In a signaling device, the combination with a sound-director adapted to project concentrated sound-waves in various given directions, of means for varying the sounds in accordance with the direction from and to which they are projected, substantially as described.

3. In a signaling device, the combination with a sound-director adapted to project concentrated sound-waves in various given directions, of means for varying the sounds in accordance with the direction from and to which they are projected, and devices for adjusting said means with relation to the points of the compass, substantially as described.

4. In a signaling device, the combination with a sound-director adapted to project concentrated sound-waves in various given directions, of means for varying the sounds in accordance with the direction from and to which they are projected, and an auxiliary signal arranged to be operated by the sound-director and adapted to indicate the course of the moving object, substantially as described.

5. In a signaling device, the combination with a rotating sound-director, of means for varying the sounds in accordance with the direction from and to which they are projected, substantially as described.

6. In a signaling device, the combination with a rotating sound-director, of means for rotating the same, and adjustable means for varying the sounds in accordance with the direction from and to which they are projected, substantially as described.

7. In a combined signaling device, the combination with a rotating sound-director, of means for varying the sounds in accordance with the direction from and to which they are projected, an auxiliary signaling device, and means controlled by the sound-director for operating the auxiliary signaling device, substantially as described.

8. In a signaling device, the combination with a sound-director, of a sounder located in operative relation therewith, means for rotating the sounder and sound-director, and means for operating the sounder to produce varying signals in accordance with the position of the sound-director, substantially as described.

9. In a signaling device, the combination with a sound-director, of a sounder located therein, a rotating support for the sounder and sound-director, a pipe connected to said sounder, a valve device in said pipe, and a ring for operating said valve, substantially as described.

10. In a signaling device, the combination with a sound-director, of a sounder located therein, a rotating support for the sounder and sound-director, a pipe connected to said sounder, a valve device in said pipe, means for operating the rotating support continuously, a ring for operating the valve device, and means for adjusting the ring, substantially as described.

In testimony whereof I have signed my name to this specification in the presence of two subscribing witnesses.

ROBERT FREDERICK FOSTER.

Witnesses:
J. J. McCarthy,
W. Clarence Duvall.